Figure 1:
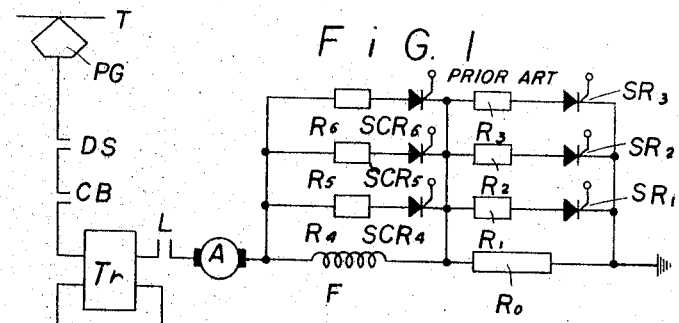

United States Patent Office 3,299,338
Patented Jan. 17, 1967

3,299,338
STARTING DEVICE FOR DIRECT
CURRENT MOTORS
Yasunosuke Torii, Musashino-shi, Tokyo, Japan, assignor to Tokyo Shibaura Electric Co. Ltd., Kawasaki-shi, Japan, a corporation of Japan
Filed Mar. 27, 1964, Ser. No. 355,259
Claims priority, application Japan, Mar. 30, 1963, 38/16,019
2 Claims. (Cl. 318—249)

This invention relates to a starting or accelerating device for a direct current motor, especially a series direct current motor.

In order to start and accelerate a series motor for driving an electric vehicle, for instance, it is desirable to gradually cut out the series resistance in a number of steps in order to smoothly accelerate the vehicle. Furthermore, field shunting or field weakening is often utilized in high speed electric vehicles.

Heretofore it has been the practice to successively cut out the series resistance and the field shunting resistance by a controller or a number of contactors controlled thereby. More recently it has been proposed to control the series resistance as well as the degree of field shunting by means of a plurality of controlled rectifier elements. However the number of required rectifier elements was large and their utilization factor was low.

It is an object of this invention to decrease the number of required controlled rectifier elements and also to improve their utilization factor thereof.

Further objects and advantages of this invention will become apparent by reference to the following description and the accompanying drawing, and the features of novelty which characterize this invention will be pointed out with particularity in the claims annexed to and forming a part of this specification.

Figure 2:
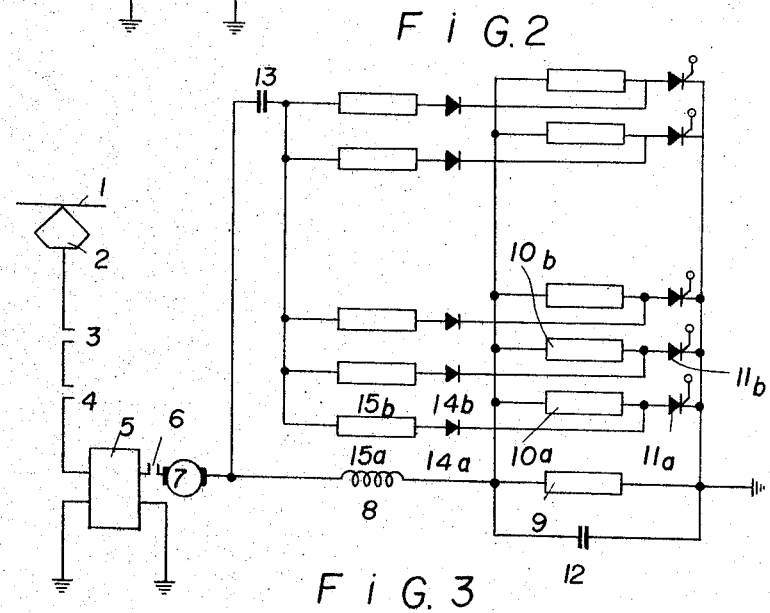
Figure 3:
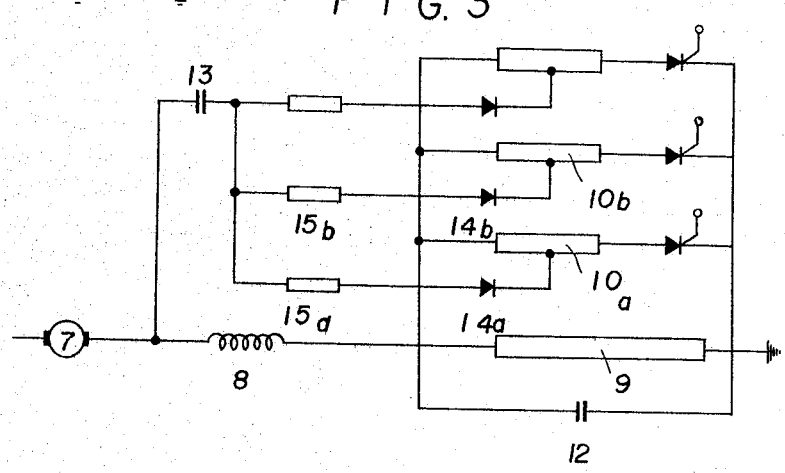

In the drawing,

FIG. 1 shows a connection diagram of one example of a prior starting device for a direct current motor; and FIGS. 2 and 3 show connection diagrams of two examples of the starting device embodying this invention.

Referring now to the accompanying drawing, FIG. 1 shows a typical starting device for a direct current motor adapted to drive an electric vehicle. One terminal of a suitable converter $Tr$ including a transformer and a rectifying apparatus is connected to an overhead trolley wire T through a pantograph PG, a disconnecting switch DS and a circuit breaker CB while the other input terminal is grounded. It is obvious that the converter $Tr$ is not used in the case of a direct current vehicle. One of the output terminals of the converter is directly grounded whereas the other output terminal is grounded through a line breaker L, an armature A and a series field winding of a direct current motor and through a starting resistor $R_0$. In parallel with the starting resistor $R_0$ are provided three resistors $R_1$, $R_2$ and $R_3$ each through one of the controlled rectifier elements such as silicon controlled rectifier elements $SCR_1$, $SCR_2$ and $SCR_3$. Also resistors $R_4$, $R_5$ and $R_6$ are connected across the series field winding F respectively through one of the similar controlled rectifier elements $SCR_4$, $SCR_5$ and $SCR_6$.

To start and accelerate the motor, suitable gate or control pulses are sequentially applied to the gate electrodes of the controlled rectifier elements $SCR_1$, $SCR_2$ and $SCR_3$ to sequentially connect resistors $R_1$, $R_2$ and $R_3$ across the resistor $R_0$. Similarly to effect field weakening or shunting control the controlled rectifier elements $SCR_4$, $SCR_5$ and $SCR_6$ are sequentially turned on to sequentially connect the resistors $R_4$, $R_5$ and $R_6$ in parallel with the field winding F to decrease current flowing therethrough. However in such a prior arrangement as outlined hereinabove, not only the utilization factor of the controlled rectifier element is low but also it is required to use a plurality of relatively expensive controlled rectifier elements of the same number as the number of control steps.

It is therefore the principal object of this invention to provide a novel starting device for a direct current motor which can reduce the number of required controlled rectifier elements by improving the utilization factor thereof.

Referring now to the accompanying drawing, FIG. 2 shows one embodiment of this invention wherein one of the input terminals of an electric converter 5, including a transformer and a rectifying device not shown, is connected to an overhead trolley wire 1 through a cooperating pantograph 2, a disconnecting switch 3 and a circuit breaker 4 while the other end of the converter 5 is grounded. One of the output terminals of the converter 5 is directly grounded and the other terminal is grounded through a line breaker 6, an armature 7 and a series field winding 8 of a direct current motor and also through a starting resistor 9. In parallel with the starting resistor 9, are connected a number of control resistors 10a, 10b . . . respectively through controlled rectifier elements, such as silicon controlled rectifier elements 11a, 11b . . . with the polarity as indicated. Also a short circuiting contactor 12 is connected in parallel with the starting resistor 9. A number of parallel circuits each including field weakening resistors 15a, 15b . . . and half wave rectifiers 14a, 14b . . . respectively having the same polarity as the rectifier elements 11a, 11b . . . are connected between the junction between the armature winding and the respective junctions between the resistors 10a, 10b . . . and their associated rectifier elements.

The operation of the starting device of this invention is as follows: At first the motor is started with only the starting resistor 9 connected in series with the armature 7 and the series field winding 8. Thereafter the controlled rectifier elements 11a and 11b are sequentially turned on under a suitable current limiting relay, not shown, to sequentially connect the control resistors 10a, 10b . . . in parallel with the main resistor 9 to progressively reduce the resultant resistance value. When all of the control resistors have been connected in parallel, the contactor 12 is closed to reduce to zero the resistance to transfer the motor current to the contactor. As a result all of the control rectifier elements 11a, 11b . . . are turned off.

Thereafter the contactor 13 is closed to connect the respective field shunting resistors 15a, 15b . . . across the field winding 8 through respective controlled rectifier elements which have been turned off. By successively turning on the controlled rectifier elements, the field shunting resistors 15a, 15b are connected in parallel with the field winding 8 to bypass the armature current around the field winding to weaken the field. In this way, according to this invention the controlled rectifier elements 11a, 11b . . . are utilized both for starting resistance control and field weakening control, thus greatly increasing the utilization factor of the rectifier elements.

It is to be understood that the half wave rectifiers 14a, 14b . . . are included for the purpose of preventing reverse current so as to prevent resistors 10a, 10b . . . from being connected in parallel through resistors 15a, 15b . . . when the resistors 10a, 10b are successively connected in parallel by rendering conductive the controlled rectifier elements 11a, 11b . . . . Since values of control resistors 10a, 10b . . . and field shunting resistors 15a, 15b are substantially different from each other, they are provided separately.

However, by connecting the field shunting resistors to an intermediate point of the respective control resistors 10a, 10b . . . , a portion of the control resistor can be used as a portion of the field shunting resistor, thus enabling to construct the assembly more economically.

As has been mentioned hereinabove, this invention provides an economical starting device for D.C. motors utilizing relatively small number of controlled rectifier elements by improving the utilization factor thereof.

While in the above described embodiment application of this invention for a direct current motor to drive an electric vehicle it should be understood that this invention can be also applied to direct current motors for other applications. It is also to be understood that various changes and modifications can be made within the true spirit and scope as defined in the appended claims.

What is claimed is:

1. A starting device for a direct current motor comprising a direct current motor having an armature and a series field winding joined at a first junction point;
   a starting resistor connected in series with said field winding;
   a plurality of control resistor branches, each branch including a control resistor, a junction point and a controlled rectifier element, said branches being connected in parallel with said starting resistor so that by a first sequential enabling of the controlled rectifier elements, said control resistors become sequentially electrically connected in parallel with said starting resistor to progressively reduce the resultant resistance value thereof;
   a first contactor for short circuiting said starting resistor after all of said control resistors are electrically connected in parallel with said starting resistor;
   a second contactor, one end of which is connected to the first junction point;
   plurality of field shunting resistors, each being connected between the other end of said second contactor and one of said second junction points in one of said branches, and, a rectifier element between each of said second junction points and the corresponding field shunting resistor, said field shunting resistors being electrically connected all at one time in parallel with said field winding through the corresponding control resistor when said second contactor is short circuited, and are then sequentially electrically connected in parallel with said field winding to bypass the armature current around the field winding to weaken the magnetic field intensity by a second sequential enabling of said controlled rectifier elements, said controlled rectifiers being used both for reducing the resultant resistance value of the starting resistor and weakening the magnetic field intensity of the field winding.

2. The device as claimed in claim 1, said control resistors including ends, said second junction points being located intermediate said ends.

References Cited by the Examiner

UNITED STATES PATENTS 2,519,118   8/1950   Curtis et al. _____ 318—406 X
3,183,427   5/1965   Hawkins et al. ____ 318—428 X
3,227,937   1/1966   Koppelmann et al.

ORIS L. RADER, *Primary Examiner.*

B. DOBECK, *Assistant Examiner.*